(12) United States Patent
Chaduiron et al.

(10) Patent No.: US 9,273,386 B2
(45) Date of Patent: Mar. 1, 2016

(54) PAIR OF GUIDING ELEMENTS OF WHICH ONE IS MADE OF SPECIFIC STEEL LEADING TO IMPROVED ANTI-SEIZING PERFORMANCES

(75) Inventors: Eric Chaduiron, Viricelles (FR); Laurent Houze, Saint-Etienne (FR); Shamba Jumaine, Saint-Etienne (FR)

(73) Assignee: H.E.F., Andrezieux Boutheon (FR)

( * ) Notice: Subject to any disclaimer, the term of this patent is extended or adjusted under 35 U.S.C. 154(b) by 1441 days.

(21) Appl. No.: 11/918,871

(22) PCT Filed: Apr. 21, 2006

(86) PCT No.: PCT/FR2006/000886
§ 371 (c)(1),
(2), (4) Date: Oct. 19, 2007

(87) PCT Pub. No.: WO2006/111661
PCT Pub. Date: Oct. 26, 2006

(65) Prior Publication Data
US 2009/0056835 A1    Mar. 5, 2009

(30) Foreign Application Priority Data
Apr. 22, 2005   (FR) .................................... 05 04062

(51) Int. Cl.
| C23C 8/26 | (2006.01) |
| F16C 17/00 | (2006.01) |
| C22C 38/44 | (2006.01) |
| C22C 38/04 | (2006.01) |
| C22C 38/46 | (2006.01) |
| F16C 9/02 | (2006.01) |
| F16C 33/04 | (2006.01) |
| F16C 33/14 | (2006.01) |
| F16C 33/12 | (2006.01) |

(52) U.S. Cl.
CPC .................. *C22C 38/44* (2013.01); *C22C 38/04* (2013.01); *C22C 38/46* (2013.01); *F16C 9/02* (2013.01); *F16C 17/00* (2013.01); *F16C 33/04* (2013.01); *F16C 33/121* (2013.01); *F16C 33/14* (2013.01)

(58) Field of Classification Search
CPC ........ C22C 38/04; C22C 38/44; C22C 38/46; C23C 8/26; F16C 17/00
USPC .................................................. 148/318, 230
See application file for complete search history.

(56) References Cited

U.S. PATENT DOCUMENTS

| 2,852,288 | A | * | 9/1958 | Booth ............................ 403/127 |
| 3,910,651 | A | * | 10/1975 | Pearce et al. ..................... 384/99 |
| 4,627,795 | A | * | 12/1986 | Schmitz-Montz ............ 417/267 |
| 4,777,842 | A | * | 10/1988 | Yamada ........................... 74/567 |
| 5,211,768 | A | * | 5/1993 | Preisser et al. ................. 148/230 |
| 5,263,552 | A | * | 11/1993 | Cline et al. .................... 184/6.19 |
| 6,241,393 | B1 | | 6/2001 | Georges et al. |
| 6,350,791 | B1 | * | 2/2002 | Feichtmeier et al. ........... 522/81 |
| 2003/0190105 | A1 | | 10/2003 | Ueda et al. |

FOREIGN PATENT DOCUMENTS

| DE | 100 12 619 A1 | 9/2001 |
| EP | 0 987 456 A1 | 3/2000 |
| EP | 1 471 159 A1 | 10/2004 |
| JP | 09-279295 | * 10/1997 |
| WO | 00/18975 A | 4/2000 |
| WO | 02/25068 A1 | 3/2002 |

OTHER PUBLICATIONS

Abstract and Machine Translation of Ito et al. (JP 09-279295) (1997).*
Celik, A., Karadeniz, S., "Investigation of compound layer formed during ion nitriding of AISI 4140 steel", Surface and Coatings Technology, 80 (1996) pp. 283-286.*

* cited by examiner

*Primary Examiner* — Jessee Roe
(74) *Attorney, Agent, or Firm* — Young & Thompson

(57) ABSTRACT

A pair of guiding elements is characterized in that at least one of its elements is made of a steel containing at least 0.15 to 0.3% by weight of carbon, 2 to 5% (preferably 2 to 3%) by weight of chromium, at least 0.45% (preferably no greater than 0.9%) by weight of molybdenum, and at least 0.01% by weight and no greater than 0.5% (preferably no greater than 0.3%) of vanadium. This steel is nitrided after being shaped whereby obtaining a compound layer consisting of iron and nitrogen atoms of a thickness ranging from 5 to 50 micrometers. The steel can also contain 0.4% to 1.5% by weight of manganese.

39 Claims, No Drawings

PAIR OF GUIDING ELEMENTS OF WHICH ONE IS MADE OF SPECIFIC STEEL LEADING TO IMPROVED ANTI-SEIZING PERFORMANCES

FIELD OF THE INVENTION

The invention concerns mechanical parts that are classed in the category of guiding elements. These guiding elements (in practice pairs of guiding elements) consist of two antagonistic parts, in contact one with the other but mobile one relative to the other so that the guiding elements to which they are fixed can be moved one relative to the other, with as little friction as possible.

The surfaces through which these parts are in contact are subjected to mechanical and chemical stresses because of this relative mobility and their environment, with the result that they are degraded more or less rapidly by wear caused by friction, by corrosion, or by both at the same time. These guiding elements can have diverse geometries corresponding to different kinematics; thus they can constitute shaft/bearing systems (sometimes referred to as shaft/pad systems), ball-joints, or slideways, in particular.

More precisely, the invention relates to guiding elements lubricated with grease and subjected to severe conditions, such as a high contact pressure, for example, or a corrosive atmosphere, or both at the same time, leading to high risks of the surfaces in contact becoming degraded.

The invention concerns preferably, although not limitatively, the guiding elements forming part of shaft/bearing systems or joints, the word "shaft" having to be understood in the generic sense of the term, as designating the male part of the joint (whereas the "bearing" is the female part of that joint); for example, it can be the crank pin or journal of a crankshaft or a camshaft.

STATE OF THE ART

1. Design of the Guiding Elements

Broadly speaking, the guide elements, and in particular the shaft/bearing systems designed for use under heavy load, are produced from a male part in steel and a female part in bronze (for systems of the earliest design) or in steel (for more recent systems).

Most of the time, there are used for such guiding elements carbon steels or construction steels of type 42 Cr Mo 4 (according to the French standard), some steels possibly being nitrided to increase their resistance to wear by friction. In the most improved versions the guiding elements can, as taught by the document EP 0 987 456, be further coated with a polymer coating layer and have a particular geometry favoring the action of the grease.

It is obviously possible and furthermore known to combine these various improvements with each other.

2. Choice of Steels

When he must design a mechanical component, the person skilled in the art has a vast choice of materials, especially steels. The composition of these steels is governed by national, regional or international standards, and the nature and the concentration of the additive elements are defined as a function of the properties required for the envisaged usage.

Thus the person skilled in the art, if he is interested in improved surface properties, may be led to take more particular interest in steels known as "steels for case hardening" and steels known as "steels for nitriding". The steels for case hardening preferably contain less than 0.4% of carbon; within this range, the area 0.2-0.4% is reserved somewhat for carbonitriding, whereas contents less than 0.2% are more particularly intended for case hardening. The steels for nitriding are preferably either non-alloyed construction carbon steels or low-alloy steels of the chrome molybdenum type, the best performing ones further containing aluminum. The literature describing these categories of steels is abundant. See for example "Pratique des traitements thermochimiques"—Editions Techniques de l'Ingénieur (this series is regularly updated), as well as the technical data sheets of the various steel suppliers.

The person skilled in the art thus has access to guides enabling him in principle to make an optimum choice of steel as a function of the processing that he has chosen and the properties that he wishes to obtain.

For information, it is pointed out here that:

case hardening is a thermochemical treatment of a steel by superficial diffusion of carbon; this superficial diffusion leads to the formation of a hard surface layer the thickness whereof can be up to 1 or even 2 mm and the hardness whereof is from 700 to 900 HV. This treatment is applied mainly to low-carbon steels; it produces a high surface hardness (resistance to wear) at the same time as preserving a good core toughness. This treatment is generally conducted in a gaseous atmosphere at a temperature close to 900° C. and for several hours; this implies that case hardening must imperatively be followed by quenching and then stress-relief annealing and finally final machining because the parts are subject to deformation at the case hardening temperature, nitriding is a thermochemical treatment causing nitrogen to diffuse under the surface of steels. After nitriding, two very different areas can be distinguished, as a function of the depth: at the surface, to around 20 microns, a layer consisting essentially of nitrides of ion ($\epsilon$ or $\gamma'$ phase) the hardness whereof is greater than 1000 HV (this layer is called the "combination layer" or "white layer"); under this layer is a zone called the "diffusion zone" in which the nitrogen is inserted into the steel (in some cases precipitation of nitrides may occur); the profile of penetration of nitrogen in this zone depends on the nature of the additive element added to the steel and the nitriding conditions; in this zone the steel is subjected to compression stresses. The treatments can be carried out either in a gaseous atmosphere or in a molten salt bath. The temperature is generally 570° C., with the result that, in contrast to case hardening, nitriding necessitates neither heat treatment nor subsequent further machining. Nitriding is in practice effected in applications where high wear resistance is required in combination with high fatigue resistance (thanks to the aforementioned compression stresses).

Problem Addressed by the Invention

It has in fact become apparent that the performance of a steel intended to be subjected to severe wear conditions, at least within a pair of guiding elements, cannot be clearly attributed only to the hard layer that may have been generated by case hardening or nitriding, and that other parameters have to be taken into consideration, in particular the composition; thus it is not possible to guarantee in advance that a nitriding treatment will suffice to confer good tribological performance on a given grade of steel. Similarly it is not at present possible to predict the tribological performance of a steel from its composition without having subjected it to tests. Thus at present it is not possible to extrapolate the performance of a new alloy from that of similar alloys.

The invention consists in a pair of guiding elements, in particular a shaft-bearing system, one of which elements is produced in a steel the particular composition whereof provides very good resistance to wear after nitriding.

DESCRIPTION OF THE INVENTION

The Applicant has discovered, in an entirely fortuitous and unexpected way, that by producing guiding elements (in particular shaft/bearing systems) in certain steels conforming to precise contents of additive elements and nitriding them it is possible to obtain entirely exceptional performance, in particular in terms of service life and durability. The surprising character of this discovery relates not only to the level of performance obtained but also to the fact that this performance is obtained without the properties through which the hardness layer obtained by nitriding these particular steels is usually characterized exceeding those obtained with steels of similar compositions; at present there is no known explanation of this phenomenon.

Indeed, the efficacy of nitriding is usually characterized by the evolution of the microhardness of the steel as a function of the depth of measurement from the surface. "Hardness/distance from surface" curves are then plotted, generally called "filiations" in France. The state of the art generally establishes a good correlation between these filiations and the wear resistance of the guiding elements. Now, in the present case, the filiations obtained are entirely comparable to those produced on other nitrided steels with compositions that are a priori equivalent but nevertheless do not lead to the very good performance that has been observed.

More precisely, the invention concerns a guiding element, in particular a bearing or a shaft of a shaft-bearing system, produced in a steel the composition whereof is:
  carbon from 0.15 to 0.3% by weight
  chromium from 2 to 5% by weight
  molybdenum at least equal to 0.45% by weight
  vanadium greater than 0.01% by weight and at most equal to 0.5%
and that is nitrided after shaping so as to obtain a layer of combination between the atoms of iron and nitrogen with a thickness from 5 microns to 50 microns.

Thus the invention proposes to preserve a combination layer (or white layer), in contrast to what is sought in high-load applications. Indeed, it is to this white layer in particular that it seems the high resistance to seizing of a guiding element according to the invention can be attributed.

Advantageously:
  the chromium content is from 2% to 3% by weight,
  the molybdenum content is at most equal to 0.9% by weight,
  the vanadium content is less than 0.3% by weight.

Advantageously, but not imperatively, this steel further contains from 0.4 to 1.5% manganese.

The other additive elements have appeared to be immaterial, seemingly playing no major role in obtaining such performance although aluminum seems to be harmful beyond 1%, and it appears desirable to avoid it (not more than 0.1%, or even 0.01%); sulfur, phosphorus and calcium seemingly can also be omitted (not more than 0.1%, even 0.01%, for example).

This is why the steel from which the guiding element is made advantageously includes no additive element apart from those cited above.

In one particularly advantageous application of the invention, these nitrided steels are used either on the shaft or on the bearing of a shaft-bearing system, as a function of the particular conditions of use; the other element of the shaft-bearing system can itself also be a steel of the specified composition, or any other compatible material, for example materials such as those mentioned in the document EP-0 987 456 cited above.

The invention nevertheless applies to many other pairs of guiding members, such as slideways, or ball-joints, or a crankshaft system or a camshaft system, in particular.

In order to conform to the invention, the steel guiding members defined hereinabove must be nitrided, but the nitriding process does not seem to have had a major influence in this case; this operation can therefore be carried out interchangeably in a molten salt bath, in a gaseous phase, or by means of an ionic process. Similarly, the presence of a surface oxide layer covering the nitride layer appears to have no significant impact on performance. Likewise the presence of friction-reducing varnish or any other surface coating, for example of the polymer type, deposited after nitriding (see in particular the document EP-0 987 456 cited above).

Thus, according to advantageous features of the invention, where applicable combined:
  said element includes non emergent cavities;
  said element carries a coating of polymer or copolymer material, advantageously chosen from polyamides, charged polyamides, epoxy resins, charged epoxy resins, polyacetate resins, polyethylene, fluorocarbons, substituted or not, polyethylene terephthalate, polyethersulfone, polyamides and polyether ether ketone,
  this element is a bearing cooperating with a shaft,
  alternatively, this element is a shaft cooperating with a bearing,
  this element is part of a pair in which the shaft is a crankshaft or a camshaft,
  these elements form a skid-slideway system in which the element produced in said steel is the slideway, for example,
  these elements form a ball-joint system in which the element produced in said steel is a ball-joint, for example,
  each of the elements is produced in a steel having said composition.

Nonlimiting Embodiments Conforming and not Conforming to the Invention

The following nonlimiting examples illustrate embodiments conforming to the state of the art, other embodiments conforming to the invention, and finally embodiments not conforming to the invention. They highlight the relationship between the composition of the specified steel in accordance with the invention and the tribological performance, on the one hand, and the astonishing absence of any clear relationship between the hardnesses of the nitriding layer (as usually defined) and that same tribological performance.

In each of these examples, the test procedure was chosen to be perfectly representative of the service life of a (standard) grease-lubricated shaft/bearing system operating under severe conditions. The procedure is the same for all the examples to enable comparison of the results. In order to be able to compare the influence of the nature of the steel, all the samples were nitrided in the same way by immersion for 90 minutes in a molten salt bath. This technique was adopted, in preference to the others that are carried out in a gaseous medium, because a salt bath is a perfectly isothermal medium, which guarantees that the treatment is strictly the same for all the samples and circumvents uncertainties as to the thermal homogeneity of gaseous nitriding ovens; however, it is obvious that the use of any other process producing the same surface layer remains within the scope of the invention.

The literature concerning the comparison of different nitriding processes, on different grades of steel, is moreover highly abundant and shows that the metallurgical differences observed are small and without significant influence on tribological performance.

In the usual way, comparison of different nitrided steels associates two types of characterization:
- a metallurgical characterization consisting in measuring the thickness of the combination microlayer and its hardness and plotting a profile of hardness as a function of the measurement depth.
- a tribological characterization by rubbing a quenched case-hardened steel ring, simulating the shaft, against a nitrided steel plate, simulating the bearing. The load applied between the ring and the plate is 250 daN, which corresponds to a Hertz pressure of 570 MPa, the sliding speed is 0.18 m/s, the contact is lubricated with grease, using a standard grease, such as a grease based on lithium soap with grade 2 paraffin mineral oil (NLGI), viscosity: 105 centistokes. The coefficient of friction is recorded as a function of time and the test is characterized by the time at the end of which seizing occurs. At the end of the test, a micrograph can be produced in order to view the wear profile.

To be more precise, the material of the quenched case hardened steel ring was chosen as a quenched case hardened 16N6C steel, hardened from 58 to 62 HRC, and the nitriding treatment of the plate simulating the ring, applied to the various examples defined hereinafter:
- immersion in a molten salt bath, of commercial composition (sold under the trademark "SURSULF®",
- treatment temperature: 570° C.,
- treatment time: 90 minutes,
- rinsing with water followed by drying.

EXAMPLE 1

Conforming to the State of the Art, not Conforming to the Invention (42 CrMo 4)

Conforming to the state of the art, the plate simulating the bearing is in steel containing 0.42% of carbon, 1% of chromium, 0.2% of molybdenum, 0.01% of vanadium and 0.83% of manganese, and was nitrided according to the procedure described above.

The microhardness of the combination layer is $1000\pm70$ kg/mm$^2$ and its thickness is $20\pm5$ micrometers. This hardness is no more than $600\pm50$ kg/mm$^2$ at 50 micrometers from the surface and decreases rapidly to reach $420\pm50$ kg/mm$^2$ at 200 micrometers depth, which is substantially the core hardness.

The friction test led to seizing after 25 min of test; metallurgical analysis of the parts after testing showed that the combination microlayer is worn in places, seizures occurring immediately at the locations where the microlayer is absent.

EXAMPLE 2

Not Conforming to the Invention (40 CrAlMo 6-12)

The plate simulating the guiding element is made in steel containing 0.44% of carbon, 1.6% of chromium, 0.32% of molybdenum, 0.12% of nickel and 1% of aluminum. This steel is nitrided according to the procedure described above.

Metallographic analysis shows the presence of a combination microlayer of hardness $1\,300\pm100$ kg/mm$^2$ and thickness $20\pm5$ micrometers. The hardness is still $820\pm50$ kg/mm$^2$ at a depth of 50 micrometers and stabilizes at $330\pm20$ kg/mm$^2$ at 200 micrometers depth which corresponds to the core hardness. The hardness profile corresponds to the expected effect since this steel was designed for that.

Subject to friction under the conditions indicated, the sample shows a first onset of seizing after 10 minutes of test, generalized seizing occurring after 60 minutes of test.

Micrographic examination of the part after the friction test shows that the microlayer is worn in places; these areas in which the steel is laid bare are then very sensitive to seizing.

This slight improvement in performance relative to the case described in example 1 is predictable and can be attributed to the higher hardness of the surface layers.

EXAMPLE 3

Conforming to the Invention (32 CrMoV 13)

The plate simulating the guiding element is in steel containing 0.27% of carbon, 2.9% of chromium, 0.88% of molybdenum, 0.26% of vanadium and 0.12% of nickel; it is nitrided according to the procedure described above.

Metallographic examination of this plate shows the presence of a combination microlayer the thickness whereof is $20\pm5$ micrometers and the hardness $1150\pm100$ kg/mm$^2$. At 50 micrometers depth, the hardness is $770\pm50$ kg/mm$^2$, it stabilizes at $350\pm20$ kg/mm$^2$ at 200 micrometers depth, which substantially corresponds to the core hardness.

The friction test causes traces of seizing to occur after 140 minutes of test, examination of the rubbing area shows that the combination microlayer is not totally worn, the residual thickness being from 5 to 8 micrometers. Its appearance is bright, it is exempt of traces of seizing; on the other hand, the microseizing observed at the origin of the stopping of the test occurred on the antagonistic part.

This improvement in performance can in no way be linked to the initial thickness of the microlayer, to its hardness, or to the evolution of the hardness as a function of the depth since, to within the measurement accuracy, these magnitudes are entirely comparable to those measured in example 2 which leads to much worse results.

EXAMPLE 4

Conforming to the Invention (15 CrMnMoV 9)

The plate simulating the guiding element consists of a steel containing 0.15% of carbon, 1.25% of manganese, 2.14% of chromium, 0.47% of molybdenum, 0.48% of nickel and 0.17% of vanadium; it is nitrided according to the procedure described above.

Its metallographic examination shows a combination microlayer at the surface the thickness whereof is $20\pm4$ micrometers and the hardness $1100\pm100$ kg/mm$^2$. At 50 micrometers depth, the hardness is $780\pm50$ kg/mm$^2$, it stabilizes from 200 micrometers depth at the value of $350\pm20$ kg/mm$^2$.

The friction test shows the first traces of seizing after 150 min of test; after dismantling, examination of the plate shows that the combination microlayer is totally worn, but the plate has a smooth uniform appearance, the microseizing having occurred only on the antagonistic part.

EXAMPLE 5

Conforming to the Invention (18 CrMo 7)

The plate simulating the guiding element is produced in steel containing 0.18% of carbon, 2% of chromium, 0.5% of molybdenum, 0.15% of nickel, 0.7% of manganese and 0.01 of vanadium. It is nitrided in accordance with the procedure described above.

The metallographic analysis shows the presence of a combination microlayer of 1150±100 kg/mm² hardness and 13±5 micrometers thickness, the hardness is still 770±50 kg/mm² at a depth of 50 micrometers under the combination layer and stabilizes at 300±50 kg/mm² at the core.

Subjected to friction under the indicated conditions, the sample shows a first onset of seizing after 225 minutes of test that is entirely remarkable.

EXAMPLES 6 to 8

Not Conforming to the Invention

| Compositions | | | | | |
|---|---|---|---|---|---|
| Designation of the steels according to the standard | % C | % Cr | % Mo | % V | % Mn |
| 15 CrMoV 6 | 0.15 | 1.25 | 0.8 | 0.2 | 0.8 |
| 30 CrMo 12 | 0.3 | 3 | 0.4 | 0 | |
| 40 CrMnMo 8 | 0.38 | 2 | 0.2 | 0.1 | |

| Surface characteristics after nitriding | | | | |
|---|---|---|---|---|
| Designation according to standard | Combination layer thickness (μm) | Combination layer hardness (kg/mm²) | Hardness at 50 μm under the layer (kg/mm²) | Core hardness (kg/mm²) |
| 15 CrMoV 6 | 15 ± 5 | 1180 ± 100 | 770 ± 50 | 400 ± 50 |
| 30 CrMo 12 | 20 ± 5 | 1120 ± 100 | 720 ± 50 | 360 ± 50 |
| 40 CrMnMo 8 | 13 ± 5 | 1050 ± 100 | 700 ± 50 | 320 ± 50 |

| Friction performance | |
|---|---|
| Designation according to standard | Service life before seizing (min) |
| 15 CrMoV 6 | 15 |
| 30 CrMo 12 | 21 |
| 40 CrMnMo 8 | 26 |

These nonlimiting examples illustrate the entirely surprising character of the results obtained with the parts produced with the nitrided steels conforming to the invention; while the surface hardness seems not to be operative in the phenomenon (the hardnesses of the first two non-conforming steels 1 and 2 bracket those of the three conforming steels 3 to 5, at the surface as much as at depth); note that, when the guiding element is made in ordinary or "nitriding" construction steel the composition whereof is outside the claimed range, the wear resistance of the combination microlayer is mediocre, and its localized disappearance as a result of wear leads immediately to seizing, whereas, when the guiding element is in steel conforming to the invention, not only is the combination microlayer, at equal hardness, worn much less quickly, but the underlying diffusion zone itself has astonishing tribological properties because it does not seize, this phenomenon eventually in extremis occurring on the antagonistic part. The service life of the component of the guiding element is therefore extended by a factor from 2.5 to more than 5, according to the case, which is a very significant advantage.

Note that in the foregoing examples there was a significant improvement in the anti-seizing properties compared to the known solutions, without increasing the hardness of the white layer and without significantly increasing the depth of the hardening (which is typically less than 500 microns, in contrast to what is sought in a document such as WO-00/18 975, for example).

The explanation of this phenomenon is as yet unknown.

As indicated hereinabove, the invention applies particularly well to a shaft-bearing system the bearing whereof is produced in a steel conforming to the definition given hereinbove, in combination with a shaft that can be in any compatible material, in particular a steel such as a steel hardened by any means and the hardness whereof is greater than 55 HCR. It can in particular be a question of a steel chosen from case-hardened, quenched, rectified steels, rectified HF quenched steels, steels hardened and then coated with hard chrome, nitrided steels, steels coated with ceramic and other carbonitrided steels.

Alternatively it is the shaft of such a shaft-bearing system that can be produced in a steel conforming to the definition cited above, with a bearing in one of the materials indicated in the preceding paragraph. In the particular case of crankshaft or camshaft systems, the steel recommended hereinabove is advantageously used for the crank pin or journal of the crankshaft or the camshaft.

The invention applies to many other pairs of guiding elements, such as those described in the document EP-0 987 456 cited above; thus the steel specified hereinabove can be used to produce, in particular, the slideway or the skid of a slideway-skid pair, or the ball-joint or the cap of a ball-joint system.

The two guiding elements of the same pair can even be produced in a steel conforming to the definition cited above, for example in steels with the same compositions.

Likewise, one of the surfaces advantageously includes non emergent cavities and/or is coated (this may be a question of the part produced in the specified steel) with a polymer or copolymer material, in particular chosen from polyimides, charged polyimides, epoxy resins, charged epoxy resins, polyacetate resins, polyethylene, fluorocarbons, substituted or not, polyethylene terephthalate, polyethersulfone, polyamides and polyether ether ketone.

The invention claimed is:

1. A guiding element, comprising:
    a steel consisting essentially of iron, 0.15 to 0.3% by weight of carbon, 2 to 5% by weight of chromium, 0.45 to 0.9% by weight of molybdenum, at most 1.5% by weight of manganese, at most 0.48% by weight of nickel, at most 0.01% aluminum and 0.01 to 0.5% by weight of vanadium,
    the guiding element having been nitrided after shaping, so as to be provided, at a surface to be lubricated and submitted to wear, with a combination layer between atoms of iron and nitrogen of a thickness between 5 microns and 50 microns, whereby this element is seizure resistant under load with grease lubrication.

2. The guiding element according to claim 1, wherein the vanadium content is at most equal to 0.3% by weight.

3. The guiding element according to claim 1, wherein the manganese content is between 0.4% by weight and 1.5% by weight.

4. The guiding element according to claim 1, wherein the guiding element includes non emergent cavities.

5. The guiding element according to claim 1, wherein the guiding element is a shaft configured to cooperate with a bearing.

6. The guiding element according to claim 1, wherein the content of carbon is between 0.18% and 0.3% by weight.

7. The guiding element according to claim 1, wherein the carbon content is 0.27% by weight, the chromium content is 2.9% by weight, the molybdenum content is 0.88% by weight, the vanadium content is 0.26% by weight and the nickel content is 0.12% by weight.

8. The guiding element according to claim 1, wherein the carbon content is 0.15% by weight, the chromium content is 2.14% by weight, the molybdenum content is 0.47% by weight, the vanadium content is 0.17% by weight, the manganese content s 1.25% by weight and the nickel content is 0.48%.

9. The guiding element according to claim 1, wherein the carbon content is 0.18% by weight, the chromium content is 2% by weight, the molybdenum content is 0.5% by weight, the vanadium content is 0.01% by weight, the manganese content is 0.7% by weight and the nickel content is 0.15%.

10. The guiding element according to claim 1, wherein the steel is a 32 CrMoV 13 steel according to French AFNOR designation.

11. The guiding element according to claim 1, wherein the steel is a 15 CrMnMoV 9 steel according to French AFNOR designation.

12. The guiding element according to claim 1, wherein the steel is a 18 CrMo 7 steel according to French AFNOR designation.

13. The guiding element according to claim 1, wherein a hardness at core is between 250 and 370 kg/mm$^2$.

14. The guiding element according to claim 1, wherein the guiding element carries a coating in polymer or copolymer material.

15. The guiding element according to claim 14, wherein the coating is in a material chosen from polyimides, charged polyimides, epoxy resins, charged epoxy resins, polyacetate resins, polyethylene, fluorocarbons, substituted or not, polyethylene terephthalate, polyethersulfone, polyamides or polyether ether ketone.

16. The guiding element according to claim 1, wherein the guiding element is a bearing configured to cooperate with a shaft.

17. The guiding element according to claim 16, wherein the shaft is a crankshaft.

18. The guiding element according to claim 16, wherein the shaft is a camshaft.

19. The guiding element according to claim 1, wherein the content of chromium is between 2% and 3% by weight.

20. The guiding element according to claim 19, wherein the manganese content is between 0.4% by weight and 1.5% by weight.

21. The guiding element according to claim 19, wherein the vanadium content is at most equal to 0.3% by weight.

22. The guiding element according to claim 21, wherein the manganese content is between 0.4% by weight and 1.5% by weight.

23. The guiding element according to claim 1, wherein the guiding element is configured to be part of a skid-slideway system.

24. The guiding element according to claim 23, wherein the guiding element is the slideway.

25. The guiding element according to any claim 1, wherein the guiding element is configured to be part of a ball-joint system.

26. The guiding element pair according to claim 25, wherein the guiding element is a ball-joint.

27. A pair of guiding elements configured for operating under load with grease lubrication comprising a first guiding element that is the guiding element according to claim 1, wherein a second guiding element is formed from steel.

28. The pair according to claim 27, wherein the second guiding element is produced from the same steel, and is provided by nitriding with a combination layer of thickness between 5 and 50 microns.

29. The guiding element according to claim 1, wherein the content of chromium is between 2.14% and 5% by weight.

30. The guiding element according to claim 29, wherein the carbon content is between 0.18% and 0.3% by weight.

31. The guiding element according to claim 1, wherein the combination layer has a hardness greater than 1000 kg/mm$^2$.

32. The guiding element according to claim 31, wherein the hardness at core is between 250 and 370 kg/mm$^2$.

33. The guiding element according to claim 1, wherein a service life and durability of said guiding element are higher than those obtained with steels of similar composition, without properties through which a hardness obtained by nitriding exceeds those obtained with said steels of similar composition.

34. The guiding element according to claim 33, wherein said properties include an evolution of a microhardness of the steel as a function of a depth of measurement from a surface.

35. A method of production of a guiding element configured for utilization under load with grease lubrication, comprising:
a step of shaping the guiding element from a steel consisting essentially of iron, 0.15 to 0.3% by weight of carbon, 2 to 5% by weight of chromium, 0.45 to 0.9% by weight of molybdenum, at most 1.5% by weight of manganese, at most 0.48% by weight of nickel, at most 0.01% aluminum and 0.01 to 0.5% by weight of vanadium; and
a subsequent step of nitriding said guiding element so as to provide the guiding element, at a surface to be lubricated and subject to wear, with a combination layer between atoms of iron and nitrogen of a thickness between 5 microns and 50 microns.

36. The method according to claim 35, wherein the combination layer has a hardness greater than 1000 kg/mm$^2$.

37. A method of implementing a guided movement comprising:
a step of shaping a pair of guiding elements, with at least one element of said pair being made of a steel consisting essentially of iron, 0.15 to 0.3% by weight of carbon, 2 to 5% by weight of chromium, 0.45 to 0.9% by weight of molybdenum, at most 1.5% by weight of manganese, at most 0.48% by weight of nickel, at most 0.01% aluminum and 0.01 to 0.5% by weight of vanadium; and
a subsequent step of nitriding said at least one element so as to provide this element, at a surface to be lubricated and submitted to wear, with a combination layer between atoms of iron and nitrogen with a thickness between 5 microns and 50 microns
a step of lubricating with grease said pair of guiding elements on the combination layer of said at least one guiding element, whereby this pair is seizure resistant when submitted to load.

38. The method of claim 37, wherein the grease is based on lithium soap with grade 2 paraffin mineral oil.

39. The method of claim 37, wherein a hardness of the combination layer is greater than 1000 kg/mm$^2$.

* * * * *